(12) United States Patent
Tomobe et al.

(10) Patent No.: US 7,606,527 B2
(45) Date of Patent: Oct. 20, 2009

(54) DIGITAL BROADCAST RECEIVING DEVICE, DIGITAL BROADCAST RECEIVING METHOD, AND PROGRAM THEREFOR

(75) Inventors: Osamu Tomobe, Mito (JP); Takaharu Ishida, Hitachi-Naka (JP); Yoshihito Sato, Hitachi (JP); Hideki Inoue, Hitachi (JP); Tomoo Yasukawa, Tokyo (JP)

(73) Assignee: Xanavi Informatics Corporation, Kanagawa-ken (JP)

( * ) Notice: Subject to any disclaimer, the term of this patent is extended or adjusted under 35 U.S.C. 154(b) by 596 days.

(21) Appl. No.: 11/509,740

(22) Filed: Aug. 25, 2006

(65) Prior Publication Data

US 2007/0049191 A1    Mar. 1, 2007

(30) Foreign Application Priority Data

Aug. 26, 2005  (JP) ............................. 2005-246416

(51) Int. Cl.
 *H04H 1/00* (2006.01)
(52) U.S. Cl. ...................... 455/3.02; 455/3.06; 455/59; 455/414.4; 348/725; 348/558; 348/554; 348/556; 375/240.01; 375/240.19
(58) Field of Classification Search ................ 455/3.02, 455/3.06, 90.1, 414.4; 348/558, 554, 556; 725/151, 131
See application file for complete search history.

(56) References Cited

U.S. PATENT DOCUMENTS

| | | | | |
|---|---|---|---|---|
| 5,978,037 | A * | 11/1999 | Hilpert et al. | 348/484 |
| 6,393,152 | B2 * | 5/2002 | Takahashi et al. | 382/233 |
| 6,490,001 | B1 * | 12/2002 | Shintani et al. | 348/554 |
| 6,549,243 | B1 * | 4/2003 | Takashimizu et al. | 348/558 |
| 6,738,421 | B1 * | 5/2004 | Ueno | 375/240.01 |
| 6,775,654 | B1 * | 8/2004 | Yokoyama et al. | 704/500 |
| 7,113,739 | B2 * | 9/2006 | Kawamata et al. | 455/3.02 |
| 7,173,674 | B2 * | 2/2007 | Takashimizu et al. | 348/725 |
| 7,436,458 | B2 * | 10/2008 | Takashimizu et al. | 348/558 |

FOREIGN PATENT DOCUMENTS

JP    2003-274303    9/2003

* cited by examiner

*Primary Examiner*—Marceau Milord
(74) *Attorney, Agent, or Firm*—Antonelli, Terry, Stout & Kraus, LLP.

(57) ABSTRACT

Provided is a digital broadcast receiving device (20) which can display a high resolution image longer without burdening users with a cumbersome operation. The digital broadcast receiving device (20) of the present invention switches, based on vehicle information, between switching thresholds by which switching is made between plural digital broadcast decoders outputting different digital broadcast images from one another in accordance with a reception state of digital broadcast waves. The plural digital broadcast decoders include, for example, a stationary reception decoder (200), which outputs a digital broadcast image for stationary receivers, and a mobile reception decoder (201), which outputs a digital broadcast image for mobile receivers.

10 Claims, 7 Drawing Sheets

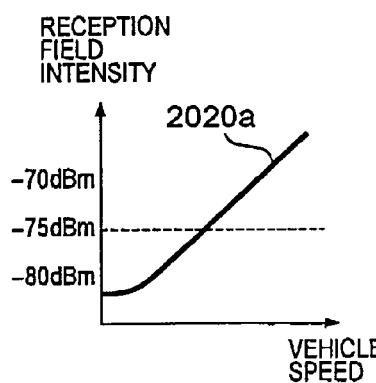
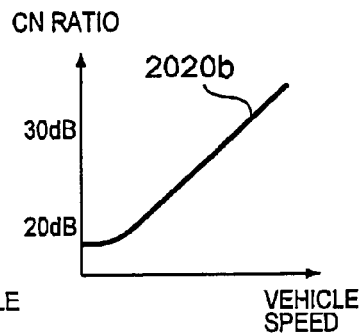
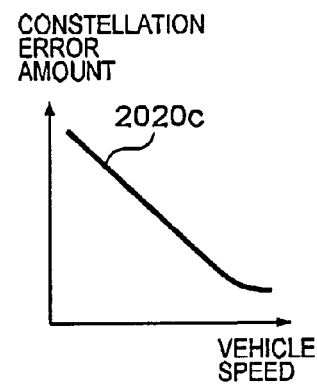
FIG. 3A — RECEPTION FIELD INTENSITY vs VEHICLE SPEED (2020a)
FIG. 3B — CN RATIO vs VEHICLE SPEED (2020b)
FIG. 3C — CONSTELLATION ERROR AMOUNT vs VEHICLE SPEED (2020c)
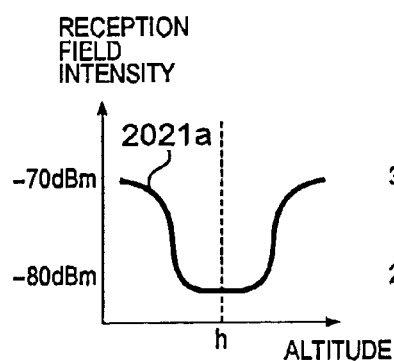
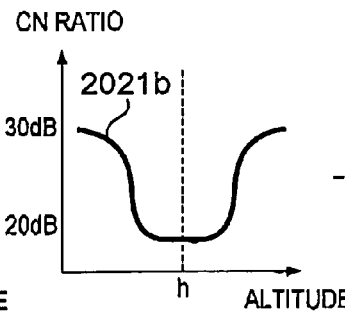
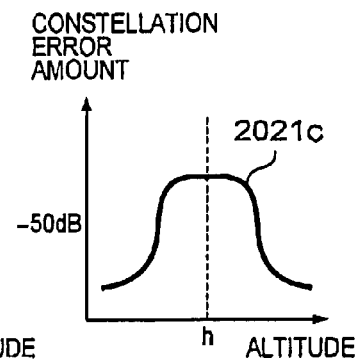
FIG. 4A — RECEPTION FIELD INTENSITY vs ALTITUDE (2021a)
FIG. 4B — CN RATIO vs ALTITUDE (2021b)
FIG. 4C — CONSTELLATION ERROR AMOUNT vs ALTITUDE (2021c)

DIGITAL BROADCAST RECEIVING DEVICE, DIGITAL BROADCAST RECEIVING METHOD, AND PROGRAM THEREFOR

BACKGROUND OF THE INVENTION

The present invention relates to a digital broadcast receiving device mounted on vehicles or other mobile bodies.

Terrestrial digital broadcasting is scheduled to start in the immediate future. Terrestrial digital broadcasting involves hierarchical transmission in which a transmission band allocated to each broadcasting station is divided into a multiple of segments and data is transmitted simultaneously in plural layers, each of which is composed of one or more segments. In hierarchical transmission, more segments constituting a layer make it possible to transmit images of higher resolution but make it more difficult to receive data in vehicles or the like while on the move, without data error. In order to address this problem, for example, ISDB-T, which is standard in Japan, is employed. The ISDB-T divides a 1-channel digital broadcast band into thirteen segments, uses twelve of the segments to provide a high resolution image to a stationary receiver, and uses the remaining one segment to provide a low resolution image through a transmission method that is resistant to transmission error.

This enables stationary receivers installed in homes or other places to receive digital broadcasting of high resolution while enabling mobile receivers such as cellular phones and PDAs on the move to receive low resolution but stable digital broadcasting.

However, users of vehicle-mounted navigation devices and other similar mobile receivers that are mounted on mobile bodies and that have larger screens than those in cellular phones and PDAs wish to see as much as possible, even while on the move, a high resolution image displayed using twelve segments.

Japanese Patent Application Laid-open Publication No. 2003-274303 (hereinafter referred to as Patent Document 1) discloses an example of how to fulfill this wish. A vehicle-mounted digital broadcast receiving device according to Patent Document 1 has a database that is obtained by measuring in advance a digital broadcast signal reception at various points on a map. While a navigation function of the device is showing a route to a destination, the device retrieves from the database the digital broadcast signal reception rate along the route and presents the reception rate to a user, thereby providing the user with information to decide whether to receive a high resolution image with the use of twelve segments or an image that is low resolution but is suitable for reception by moving receivers with the use of one segment.

Patent Document 1, however, merely presents a pre-measured reception rate to the user, and it is the user that switches between reception of a high resolution image with the use of twelve segments and reception of a low resolution image with the use of one segment, thereby burdening the user with a cumbersome operation. Accordingly, the user may have passed a poor reception area before switching to low resolution image reception, or the user may forget to switch to reception of a high resolution image with the use of twelve segments and stick to reception of a low resolution image with the use of one segment after a poor reception area is replaced by a good reception area.

Moreover, when radio waves are received by a mobile body such as a vehicle, the distance from an object that reflects radio waves changes as the mobile body moves and the intensity of radio waves received by the mobile body fluctuates rapidly. This means that, even at a point where the reception is high enough to receive a high resolution image with the use of twelve segments while the mobile body is stationary, there is no guarantee that the high resolution image can be displayed without a break while the mobile body is on the move. Accordingly, a user on the move may give up receiving a high resolution image that can be disturbed or broken, and stick to reception of a low resolution image with the use of one segment.

SUMMARY OF THE INVENTION

The present invention has been made in view of the above-mentioned circumstances, and an object of the present invention is therefore to prolong the time in which high resolution images can be displayed without burdening users with a cumbersome operation.

In order to attain the above-mentioned object, a digital broadcast receiving device according to the present invention switches, based on vehicle information, between switching thresholds by switching between plural digital broadcast decoders outputting digital broadcast images that are different from one another, in accordance with a reception state of digital broadcast waves.

Further, according to the present invention, there is provided, for example, a digital broadcast receiving device mounted on a mobile body including:

a mobile body information obtaining means which obtains mobile body information that is information about the mobile body;

a demodulating means which receives a digital broadcast wave, demodulates the digital broadcast wave, and outputs a reception state of the digital broadcast wave;

plural digital broadcast decoders which decode a signal demodulated by the demodulating means and output digital broadcast images different from one another;

a switching threshold storing means which associates with the mobile body information and stores in advance a switching threshold used in choosing, in accordance with the reception state, which one of the plural digital broadcast decoders is to decode the signal demodulated by the demodulating means; and a decoder switching means which consults the switching threshold storing means to obtain a switching threshold that is associated with the mobile body information, which chooses one of the digital broadcast decoders, based on the reception state and the obtained switching threshold, to decode the signal demodulated by the demodulating means, and which displays results of the decoding on a display device.

The digital broadcast receiving device according to the present invention can display the high resolution images longer without burdening a user with the cumbersome operation.

BRIEF DESCRIPTION OF THE DRAWINGS

In the accompanying drawings;

FIGS. 3A to 3C are conceptual diagrams each illustrating an example of a switching threshold table;

FIGS. 4A to 4C are conceptual diagrams each illustrating an example of another switching threshold table;

DETAILED DESCRIPTION OF THE PREFERRED EMBODIMENTS

A first embodiment of the present invention is described below with reference to the accompanying drawings.

Figure 1:
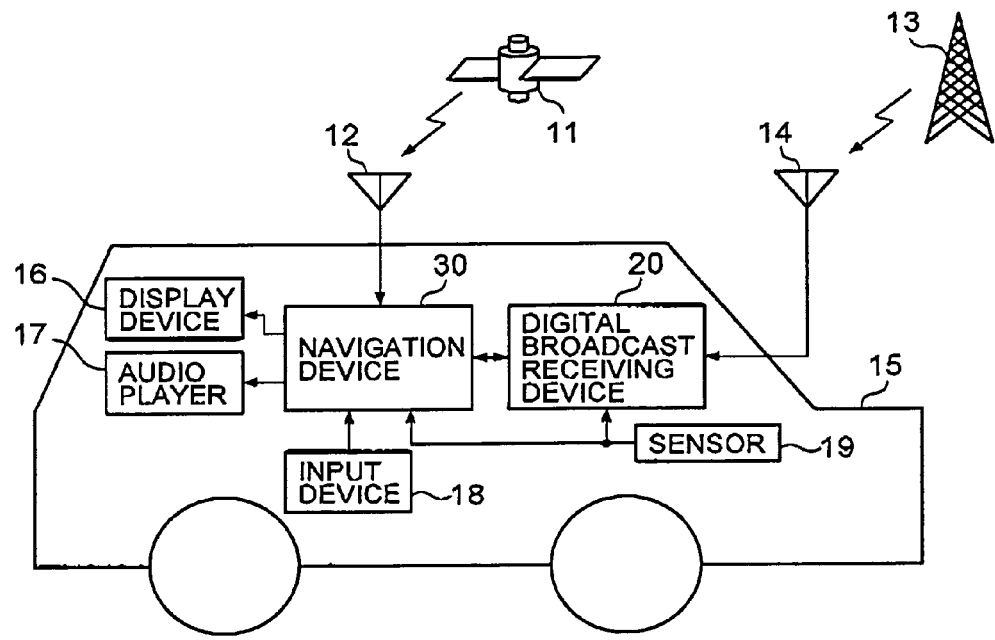
FIG. 1 is a diagram showing a configuration of a digital broadcast system according to one embodiment of the present invention.

FIG. 1 shows the configuration of a digital broadcast system 10 according to one embodiment of the present invention. The digital broadcast system 10 has a digital broadcast relay station 13, a digital broadcast antenna 14, a digital broadcast receiving device 20, a navigation device 30, a display device 16, and an audio player 17. The digital broadcast relay station 13 receives, via a cable or the like, digital broadcast signals containing a high resolution image for stationary receivers and a low resolution image for mobile receivers, which are created in a broadcast station. The digital broadcast relay station 13 modulates the received digital broadcast signals in accordance with a modulation method prescribed in terrestrial digital broadcasting, and broadcasts the demodulated signals using radio waves.

A vehicle 15 is equipped with a GPS antenna 12, the digital broadcast antenna 14, the display device 16, the audio player 17, an input device 18, a sensor 19, the digital broadcast receiving device 20, and the navigation device 30.

The digital broadcast receiving device 20 receives the digital broadcast signals from the digital broadcast relay station 13 through the digital broadcast antenna 14. Based on vehicle speed-indicating signals from the sensor 19, which is a vehicle speed sensor or the like, vehicle altitude-indicating signals from the navigation device 30, or other signals, the digital broadcast receiving device 20 extracts the high resolution image for stationary receivers or the low resolution image for mobile receivers from the digital broadcast signals, to send the extracted images to the navigation device 30.

The navigation device 30 has map data, and estimates the current location of the vehicle 15 on the map based on GPS signals from a geodetic satellite 11, which is a GPS satellite or the like, as well as information from the sensor 19 including the speed of the vehicle 15 and the traveling direction of the vehicle 15. The navigation device 30 displays the estimated current location of the vehicle 15 on the display device 16 along with map data of the vicinity of the current location.

The navigation device 30 also has road data including the coordinates and travel time for a road. When a user enters a start point and a destination in the navigation device 30 through the input device 18, the navigation device 30 looks up the road data for a recommended route and displays the recommended route found, on the display device 16. If a 'navigate' command is given with respect to the displayed recommended route by the user through the input device 18, the navigation device 30 displays the current location of the vehicle 15 on the display device 16 along with a map showing the recommended route. The navigation device 30 leads the driver along the recommended route by having the audio player 17 play an audio message to inform the driver of an intersection or the like existing on the recommended route a given distance ahead from the current location of the vehicle 15, at which the vehicle 15 should turn left or right.

The navigation device 30 calculates the altitude of the vehicle 15 based on GPS signals from the geodetic satellite 11, and sends the calculated vehicle altitude to the digital broadcast receiving device 20. The navigation device 30 displays on the display device 16 the high resolution image for stationary receivers or the low resolution image for mobile receivers which has been extracted by the digital broadcast receiving device 20, and simultaneously has the audio player 17 play a sound that is associated with the displayed image. The navigation device 30 also receives, from the user, through the input device 18, settings information for the digital broadcast receiving device 20 regarding reception of digital broadcast signals, and sends the received settings information to the digital broadcast receiving device 20.

The digital broadcast receiving device 20, the navigation device 30, the display device 16, the audio player 17, and the input device 18 are, in this embodiment, components separate from one another, but may instead be integrated all into one device. Alternatively, two or more of them may be made into one device.

Figure 2:
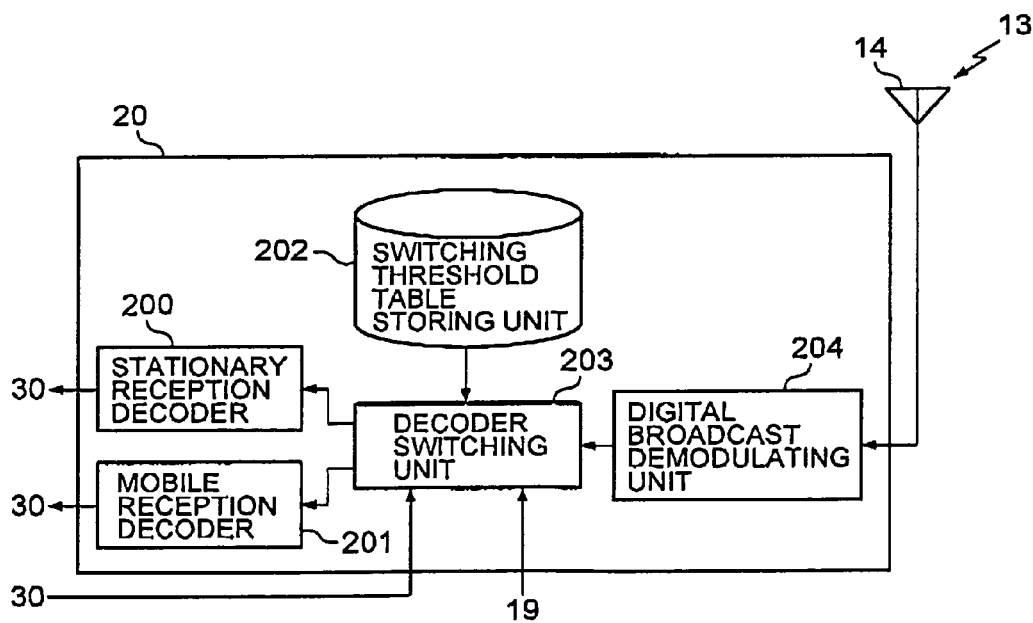
FIG. 2 is a diagram showing a detailed configuration example of a digital broadcast receiving device according to a first embodiment.

FIG. 2 shows a detailed configuration example of the digital broadcast receiving device 20 in the first embodiment. The digital broadcast receiving device 20 has a stationary reception decoder 200, a mobile reception decoder 201, a switching threshold table storing unit 202, a decoder switching unit 203, and a digital broadcast demodulating unit 204.

The digital broadcast demodulating unit 204 demodulates, in accordance with, for example, OFDM, the digital broadcast signals received from the digital broadcast relay station 13 via the digital broadcast antenna 14. The digital broadcast demodulating unit 204 performs FFT conversion on the demodulated signals, to thereby extract thirteen segments. The digital broadcast demodulating unit 204 also generates a signal that indicates the reception state of digital broadcast signals received via the digital broadcast antenna 14, and sends the generated signal to the decoder switching unit 203.

Examples of the signal indicative of the reception state include the reception field intensity of digital broadcast signals to be received, the carrier to noise ratio (CN ratio) which is the noise level relative to the carrier wave reception level in digital broadcast signals to be received, and the constellation error amount which indicates the amount of deviation from the constellation of received data.

A constellation error amount V is calculated from the following relational expression:

$$V = 20\log_{10}\left(\frac{L_1}{L_2}\right) \qquad \text{[Mathematical Expression 1]}$$

$L_1$ represents the distance between a carrier on the IQ plane and an actually received signal, and is calculated from the following relational expression:

$$L_1 = \sqrt{\frac{A^2 + B^2 + C^2 + \cdots}{n}}$$ [Mathematical Expression 2]

where n represents the number of received signals.

$L_2$ represents the distance between adjacent carriers and, when the modulation method employed is 64 QAM, is calculated from the following relational expression:

$$L_2 = \frac{I_{max}}{8}$$ [Mathematical Expression 3]

The stationary reception decoder 200 decodes, of the thirteen segments extracted by the digital broadcast demodulating unit 204, twelve segments containing a digital broadcast image for stationary reception, and extracts the high resolution image for stationary receivers. The mobile reception decoder 201 decodes, of the thirteen segments extracted by the digital broadcast demodulating unit 204, one segment containing a digital broadcast image for mobile reception, and extracts the low resolution image for mobile receivers.

The switching threshold table storing unit 202 stores a switching threshold for switching between the stationary reception decoder 200 and the mobile reception decoder 201 in accordance with the signal generated by the digital broadcast demodulating unit 204 to indicate the reception state. The switching threshold varies depending on vehicle information. This embodiment employs three types of reception state-indicating signal: the reception field intensity, the CN ratio, and the constellation error amount, and two types of vehicle information-indicating signal: the speed of the vehicle 15 and the altitude of the vehicle 15. The switching threshold table storing unit 202 therefore stores six different switching threshold tables, reflecting the number of combinations of reception state-indicating signals and vehicle-information indicating signals.

The user determines which of the reception field intensity, the CN ratio, and the constellation error amount is to be used as the reception state-indicating signal as well as which of the speed of the vehicle 15 and the altitude of the vehicle 15 is to be used as the vehicle information-indicating signal, and sets the decoder switching unit 203 accordingly in advance through the navigation device 30. This enables the decoder switching unit 203 to make a switch between the stationary reception decoder 200 and the mobile reception decoder 201 by using one of several different switching threshold tables (i.e., six switching threshold tables, in this embodiment).

The decoder switching unit 203 receives the reception state-indicating signal from the digital broadcast demodulating unit 204 and the vehicle information-indicating signal from the sensor 19 and the navigation device 30. Using a switching threshold table that is specified by the settings information entered by the user, the decoder switching unit 203 extracts a switching threshold that is associated with the value of the vehicle information-indicating signal, and compares the extracted switching threshold with the value of the reception state-indicating signal to choose the stationary reception decoder 200 or the mobile reception decoder 201.

The chosen decoder extracts a digital broadcast image from the thirteen segments extracted by the digital broadcast demodulating unit 204.

FIGS. 3A to 3C are conceptual diagrams each illustrating an example of a switching threshold table 2020. FIG. 3A shows an example of the relation between the switching threshold and the vehicle speed in a case where the reception state-indicating signal is the reception field intensity and the vehicle information-indicating signal is the speed of the vehicle 15. Generally speaking, the quality of a signal received by the digital broadcast demodulating unit 204 is better when the reception field intensity is stronger. The example shown in FIG. 3A is set such that the faster the vehicle speed, the stronger the reception field intensity corresponding to the switching threshold.

The decoder switching unit 203 extracts, from a switching threshold table 2020a shown in FIG. 3A, a switching threshold that is associated with a vehicle speed obtained from the sensor 19. In a case where a reception field intensity obtained from the digital broadcast demodulating unit 204 is equal to or stronger than the extracted switching threshold, the decoder switching unit 203 has the stationary reception decoder 200 decode twelve segments out of the thirteen segments extracted by the digital broadcast demodulating unit 204, to thereby extract the high resolution image for stationary receivers. On the other hand, in a case where a reception field intensity obtained from the digital broadcast demodulating unit 204 is weaker than the extracted switching threshold, the decoder switching unit 203 has the mobile reception decoder 201 decode one segment out of the thirteen segments extracted by the digital broadcast demodulating unit 204, to thereby extract the low resolution image for mobile receivers.

If the switching threshold is to be constant irrespective of the speed of the vehicle 15, the switching threshold may be determined by performing a reception test while varying the combination of the reception field intensity and the speed of the vehicle 15, and then performing statistical processing such as averaging on results of the test. For instance, −75 dBm is determined as an appropriate switching threshold as shown in FIG. 3A. However, the quality of a signal received by the digital broadcast demodulating unit 204 degrades as the vehicle speed increases, due to the influence of fading and the like.

Therefore, whereas a reception field intensity near but over the switching threshold enables the stationary reception decoder 200 to extract the high resolution image for stationary receivers without a visually or acoustically discernible error such as a break when the vehicle speed is slow, a reception field intensity equal to or stronger than the switching threshold does not ensure that the high resolution image for stationary receivers can always be extracted without a visually or acoustically discernible error such as a break when the vehicle speed is fast.

If the switching threshold is to be set such that the stationary reception decoder 200 is chosen only when the high resolution image for stationary receivers can be extracted stably, a reception field intensity high enough to ensure stable extraction of the high resolution image for stationary receivers when the vehicle speed is fast may be set as the switching threshold. In this case, usually, the reception field intensity exceeds the switching threshold less often while the vehicle is running, and the low resolution image for mobile receivers is displayed on the display device 16 more often. This means less opportunity for display of an expressive broadcast that is only accomplished with the high resolution image for stationary receivers, and advertisement effects of commercials and the like may be lowered.

In contrast, the present invention sets low the switching threshold corresponding to the reception field intensity when the vehicle speed is slow, and sets the switching threshold corresponding to the reception field intensity higher as the vehicle speed increases The decoder switching unit 203 can thus make the stationary reception decoder 200 extract the high resolution image for stationary receivers when the vehicle speed is low despite a low reception field intensity. This increases the chance for the digital broadcast receiving device 20 to display a demonstrative broadcast that is only accomplished with the high resolution image for stationary receivers.

FIG. 3B shows an example of the relation between the switching threshold and the vehicle speed in the case where the reception state-indicating signal is the CN ratio and the vehicle information-indicating signal is the speed of the vehicle 15. Generally speaking, the quality of a signal received by the digital broadcast demodulating unit 204 is better when the CN ratio is larger. The example shown in FIG. 3B is set, similarly to FIG. 3A, such that the faster the vehicle speed, the larger the CN ratio corresponding to the switching threshold. The decoder switching unit 203 can thus make the stationary reception decoder 200 extract the high resolution image for stationary receivers when the vehicle speed is low despite a low CN ratio.

FIG. 3C shows an example of the relation between the switching threshold and the vehicle speed in cases where the reception state-indicating signal is the constellation error amount and the vehicle information-indicating signal is the speed of the vehicle 15. Generally speaking, the quality of a signal received by the digital broadcast demodulating unit 204 is better when the constellation error amount is smaller. The example shown in FIG. 3C is set, similarly to FIG. 3A, such that the faster the vehicle speed, the smaller the constellation error amount corresponding to the switching threshold. The decoder switching unit 203 can thus make the stationary reception decoder 200 extract the high resolution image for stationary receivers when the vehicle speed is low despite a large constellation error amount.

Each switching threshold table 2020 in the examples of FIGS. 3A to 3C is graphed partially as a straight line, but may instead be graphed entirely as a curve.

FIGS. 4A to 4C are conceptual diagrams each illustrating an example of a switching threshold table 2021. FIG. 4A shows an example of the relation between the switching threshold and the altitude in cases where the reception state-indicating signal is the reception field intensity and the vehicle information-indicating signal is the altitude of the vehicle 15. The symbol "h" in the drawings denotes the average altitude at a transmission antenna level of the digital broadcast relay station 13. Generally speaking, the quality of a signal received by the digital broadcast demodulating unit 204 lowers as the altitude difference from the transmission antenna level altitude of the digital broadcast relay station 13 increases. The example shown in FIG. 4A is set such that the larger the difference between the altitude of the vehicle 15 and the average altitude at the transmission antenna level of the digital broadcast relay station 13, the stronger the reception field intensity corresponding to the switching threshold.

FIG. 4B shows an example of the relation between the switching threshold and the altitude in the case where the reception state-indicating signal is the CN ratio and the vehicle information-indicating signal is the altitude of the vehicle 15. The example shown in FIG. 4B is set, similarly to FIG. 4A, such that the larger the difference between the altitude of the vehicle 15 and the average altitude at the transmission antenna level of the digital broadcast relay station 13, the larger the CN ratio corresponding to the switching threshold.

FIG. 4C shows an example of the relation between the switching threshold and the altitude in the case where the reception state-indicating signal is the constellation error amount and the vehicle information-indicating signal is the altitude of the vehicle 15. The example shown in FIG. 4C is set, similarly to FIG. 4A, such that the larger the difference between the altitude of the vehicle 15 and the average altitude at the transmission antenna level of the digital broadcast relay station 13, the smaller the constellation error amount corresponding to the switching threshold.

Figure 5:
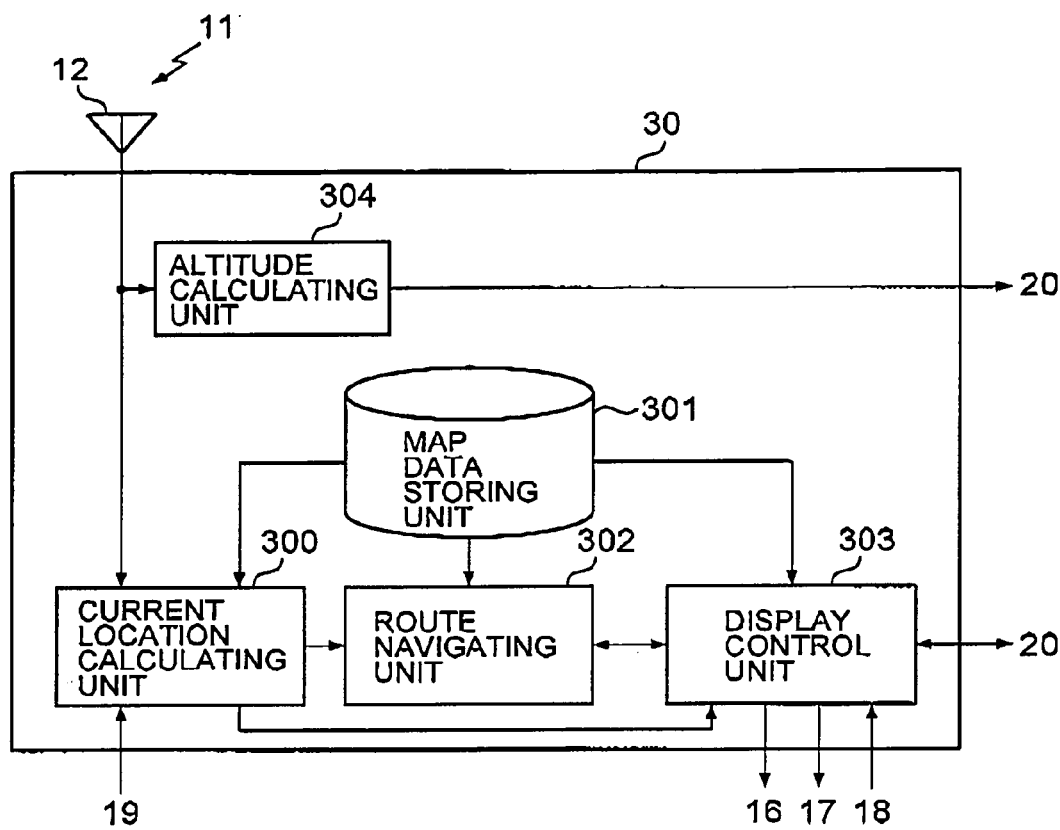
FIG. 5 is a diagram showing a detailed configuration example of a navigation device.

FIG. 5 shows a detailed configuration example of the navigation device 30. The navigation device 30 has a current location calculating unit 300, a map data storing unit 301, a route navigating unit 302, a display control unit 303, and an altitude calculating unit 304. The map data storing unit 301 stores road data in which a road is approximated with plural line segments called links, and map data. Each link is associated with information including the length of the link, whether it is a one-way road or a two-way road, the travel time by vehicle, and the start point coordinates and end point coordinates of the link.

The altitude calculating unit 304 calculates the altitude of the vehicle 15 based on GPS signals from the geodetic satellite 11. The current location calculating unit 300 estimates the current location of the vehicle 15 based on the road data of the map data storing unit 301, GPS signals from the geodetic satellite 11, the speed of the vehicle 15 provided by the sensor 19, and the travel direction of the vehicle 15 provided by the sensor 19. The current location of the vehicle 15 is estimated, for example, regularly through map matching. The current location calculating unit 300 sends the estimated current location of the vehicle 15 to the display control unit 303 and route navigating unit 302.

The route navigating unit 302 looks up the road data in the map data storing unit 301 when information such as a start point, a destination, and search conditions is received from the display control unit 303 to search for a recommended route from the start point to the destination by Dijkstra's algorithm or the like. The route navigating unit 302 sends the recommended route to the display control unit 303.

When a 'navigate route' command is received from the display control unit 303, the route navigating unit 302 sends to the display control unit 303 information on a recommended route near the current vehicle location estimated by the current location calculating unit 300. The route navigating unit 302 also notifies the display control unit 303 of an intersection or the like existing on the recommended route a given distance ahead from the current location of the vehicle 15, at which the vehicle 15 should turn left or right.

The display control unit 303 receives the current vehicle location estimated by the current location calculating unit 300, obtains map data of the vicinity of the current location from the map data storing unit 301, and displays the current location on the display device 16 along with the obtained map data.

When the user of the navigation device 30 enters a start point, a destination, and search conditions, through the input device 18, the display control unit 303 sends the entered start point, destination, and search conditions to the route navigating unit 302. The display control unit 303 receives a recommended route from the route navigating unit 302 in response, and displays the received recommended route on the display device 16.

The display control unit 303 receives, from the user, via the input device 18, a 'navigate' command with respect to a recommended route that has been found by the route navigating unit 302, and displays the current location of the vehicle 15 estimated by the current location calculating unit 300 on the display device 16 along with map data that shows the recommended route. When informed by the route navigating unit 302 of an intersection or the like existing on the recommended route a given distance ahead from the current location of the vehicle 15, at which the vehicle 15 should turn left or right, the display control unit 303 leads the driver along the recommended route by having the audio player 17 play an audio message to that effect.

The display control unit 303 also receives, from the user, via the input device 18, information for specifying which switching threshold table is to be used by the decoder switching unit 203 to make a switch between the stationary reception decoder 200 and the mobile reception decoder 201 (i.e., information indicating which of the reception field intensity, the CN ratio, and the constellation error amount is to be used as the reception state-indicating signal, and which of the speed of the vehicle 15 and the altitude of the vehicle 15 is to be used as the vehicle information-indicating signal) The display control unit 303 sends this information to the decoder switching unit 203.

When instructed by the user via the input device 18 to start receiving a digital broadcast, the display control unit 303 sends a 'start digital broadcast reception' command to the digital broadcast receiving device 20. The display control unit 303 then obtains a digital broadcast image and sound decoded by the stationary reception decoder 200 or the mobile reception decoder 201, and displays the obtained image on the display device 16 while playing the obtained sound on the audio player 17. When instructed by the user via the input device 18 to stop receiving a digital broadcast, the display control unit 303 sends a 'stop digital broadcast reception' command to the digital broadcast receiving device 20.

Figure 6:
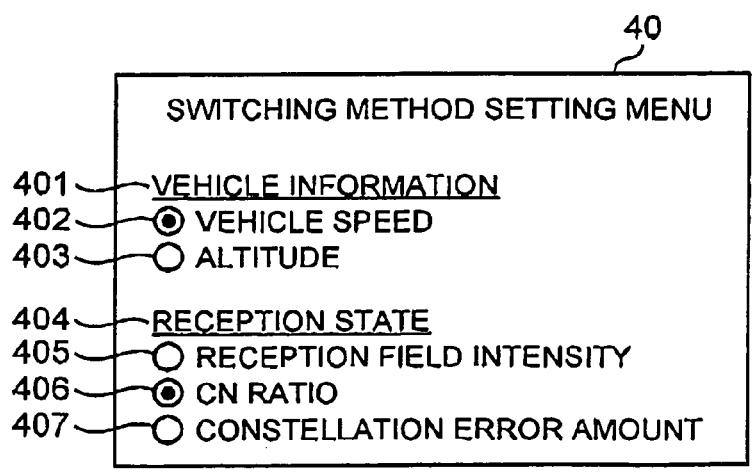
FIG. 6 is a diagram showing an example of a configuration of a setting menu screen.

FIG. 6 shows an example of the configuration of a setting menu screen 40. The display control unit 303 displays on the display device 16 the setting menu screen 40, which is for setting information used by the decoder switching unit 203 to make a switch between the stationary reception decoder 200 and the mobile reception decoder 201. The user chooses either a radio button 402 or a radio button 403 through the input device 18, thereby setting the vehicle speed or the altitude as vehicle information 401. The user also chooses a radio button 405, a radio button 406, or a radio button 407 through the input device 18, thereby setting one of the reception field intensity, the CN ratio, and the constellation error amount as a reception state 404.

The information for specifying a switching threshold table that is set through the input device 18 is sent via the display control unit 303 to the decoder switching unit 203 to be kept by the decoder switching unit 203.

Figure 7:
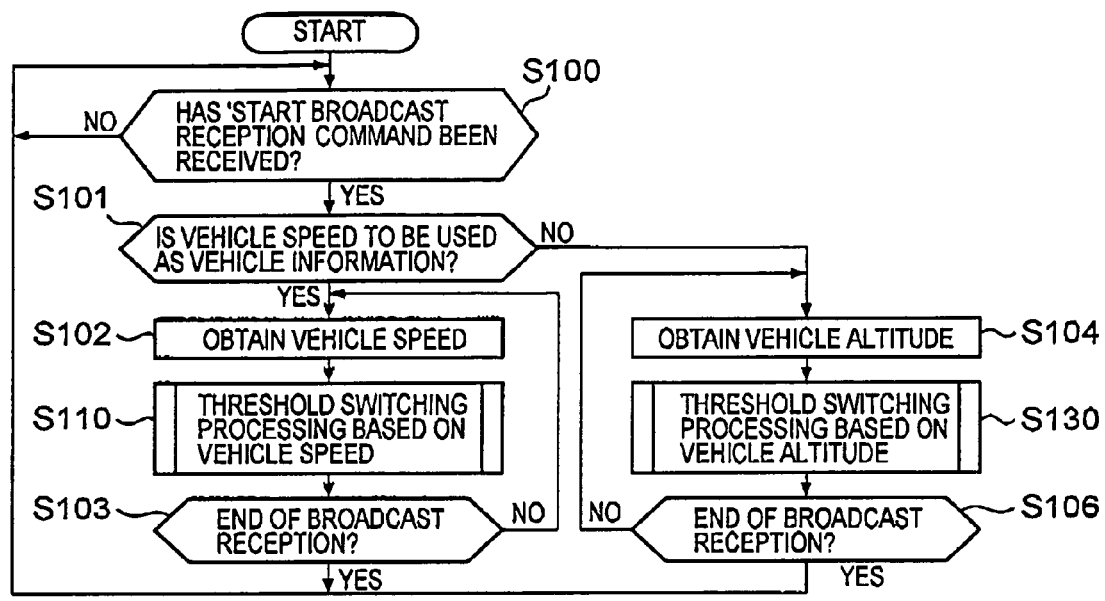
FIG. 7 is a flow chart showing an example of processing that is executed by the digital broadcast receiving device in the first embodiment.

FIG. 7 is a flow chart showing an example of processing that is executed by the digital broadcast receiving device 20 in the first embodiment. The digital broadcast receiving device 20 starts the processing shown in this flow chart when a given event such as the start of an engine of the vehicle 15 occurs. First, the decoder switching unit 203 judges whether or not a 'start digital broadcast reception' command has been received from the user via the display control unit 303 (S100). When the 'start digital broadcast reception' command has not been received (S100: No), the decoder switching unit 203 repeats Step S100.

When the 'start digital broadcast reception' command has been received (S100: Yes), the decoder switching unit 203 judges, from preset information for specifying which switching threshold table is to be used, whether to employ the vehicle speed as the vehicle information (S101). When the vehicle speed is to be employed as the vehicle information (S101: Yes), the vehicle speed of the vehicle 15 is obtained from the sensor 19 (S102).

The decoder switching unit 203 next chooses, based on the obtained vehicle speed, through processing described later, one of the plural switching threshold tables 2020 stored in the switching threshold table storing unit 202. The decoder switching unit 203 instructs, in accordance with the switching threshold table 2020 chosen, the stationary reception decoder 200 or the mobile reception decoder 201 to decode thirteen segments extracted by the digital broadcast demodulating unit 204 (S110).

Then, the decoder switching unit 203 judges whether or not a 'stop digital broadcast reception' command has been received from the user via the display control unit 303 (S103). When the 'stop digital broadcast reception' command has not been received from the user (S103: No), the decoder switching unit 203 again performs the processing shown in Step S102. When the 'stop digital broadcast reception' command has been received from the user (S103: Yes), the decoder switching unit 203 again performs the processing shown in Step S100.

When it is judged in Step S101 that the vehicle information to be used is not the vehicle speed (S101: No), the decoder switching unit 203 obtains the altitude of the vehicle 15 from the altitude calculating unit 304 (S104). The decoder switching unit 203 chooses, based on the obtained altitude of the vehicle 15, through processing described later, one of the switching threshold tables 2020 stored in the switching threshold table storing unit 202. The decoder switching unit 203 instructs, in accordance with the switching threshold table 2020 chosen, the stationary reception decoder 200 or the mobile reception decoder 201 to decode thirteen segments extracted by the digital broadcast demodulating unit 204 (S130).

Then the decoder switching unit 203 judges whether or not a 'stop digital broadcast reception' command has been received from the user via the display control unit 303 (S106). When the 'stop digital broadcast reception' command has not been received from the user (S106: No), the decoder switching unit 203 again performs the processing shown in Step S104. When the 'stop digital broadcast reception' command has been received from the user (S106: Yes), the decoder switching unit 203 again performs the processing shown in Step S100.

Figure 8:
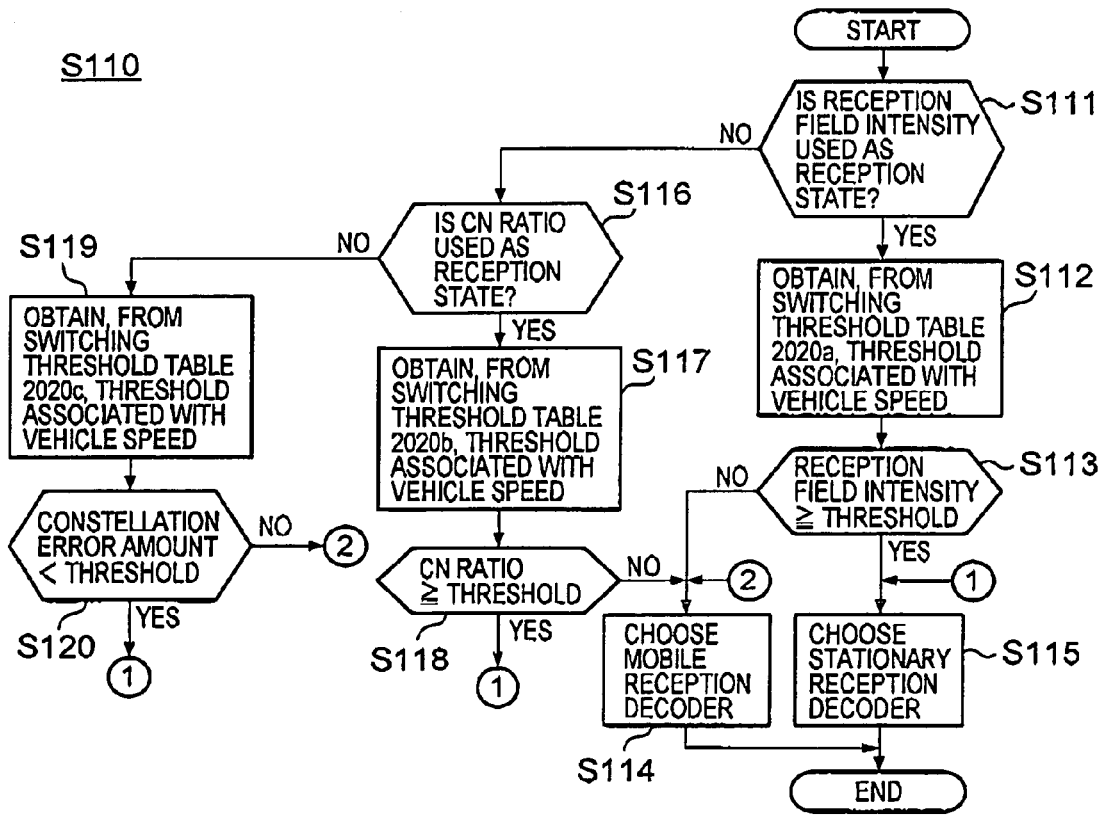
FIG. 8 is a flow chart showing an example of threshold switching processing in Step S110.

FIG. 8 is a flow chart showing an example of threshold switching processing in Step S110. First, the decoder switching unit 203 judges, from preset information for specifying which switching threshold table is to be used, whether to employ the reception field intensity as the reception state (S111). When the reception field intensity is to be employed as the reception state (S111: Yes), the decoder switching unit 203 consults the switching threshold table 2020a to obtain a switching threshold that is associated with the vehicle speed obtained in Step S102 (S112).

The decoder switching unit 203 then judges whether or not a reception field intensity value created by the digital broadcast demodulating unit 204 is equal to or stronger than the switching threshold obtained from the switching threshold table 2020a (S113). When the reception field intensity is equal to or stronger than the switching threshold (S113: Yes), the decoder switching unit 203 has the stationary reception decoder 200 decode twelve segments out of the thirteen segments extracted by the digital broadcast demodulating unit 204 and extract the high resolution image for stationary receivers (S115), thereby completing the processing of this flow chart.

On the other hand, when the reception field intensity is weaker than the switching threshold (S113; No), the decoder switching unit 203 has the mobile reception decoder 201 decode one segment out of the thirteen segments extracted by the digital broadcast demodulating unit 204 and extract the low resolution image for mobile receivers (S114), thereby completing the processing of this flow chart.

When it is judged in Step S111 that the reception field intensity is not to be used as the reception state (S111: No), the decoder switching unit 203 judges, from preset information for specifying which switching threshold table is to be used, whether to employ the CN ratio as the reception state (S116). When the CN ratio is to be employed as the reception state (S116: Yes), the decoder switching unit 203 consults a switching threshold table 2020b to obtain a switching threshold that is associated with the vehicle speed obtained in Step S102 (S117).

The decoder switching unit 203 then judges whether or not a CN ratio value created by the digital broadcast demodulating unit 204 is equal to or larger than the switching threshold obtained from the switching threshold table 2020b (S118). When the CN ratio is equal to or larger than the switching threshold (S118: Yes), the decoder switching unit 203 performs the processing shown in Step S115. On the other hand, when the CN ratio is smaller than the switching threshold (S118: No), the decoder switching unit 203 performs the processing shown in Step S114.

When it is judged in Step S116 that the CN ratio is not to be used as the reception state, in other words, the constellation error amount is to be employed as the reception state (S116: No), the decoder switching unit 203 consults a switching threshold table 2020c to obtain a switching threshold that is associated with the vehicle speed obtained in Step S102 (S119). The decoder switching unit 203 then judges whether or not a constellation error amount value created by the digital broadcast demodulating unit 204 is smaller than the switching threshold obtained from the switching threshold table 2020c (S120).

When the constellation error amount is smaller than the switching threshold (S120: Yes), the decoder switching unit 203 performs the processing shown in Step S115. On the other hand, when the constellation error amount is equal to or larger than the switching threshold (S120; No), the decoder switching unit 203 performs the processing shown in Step S114.

Figure 9:
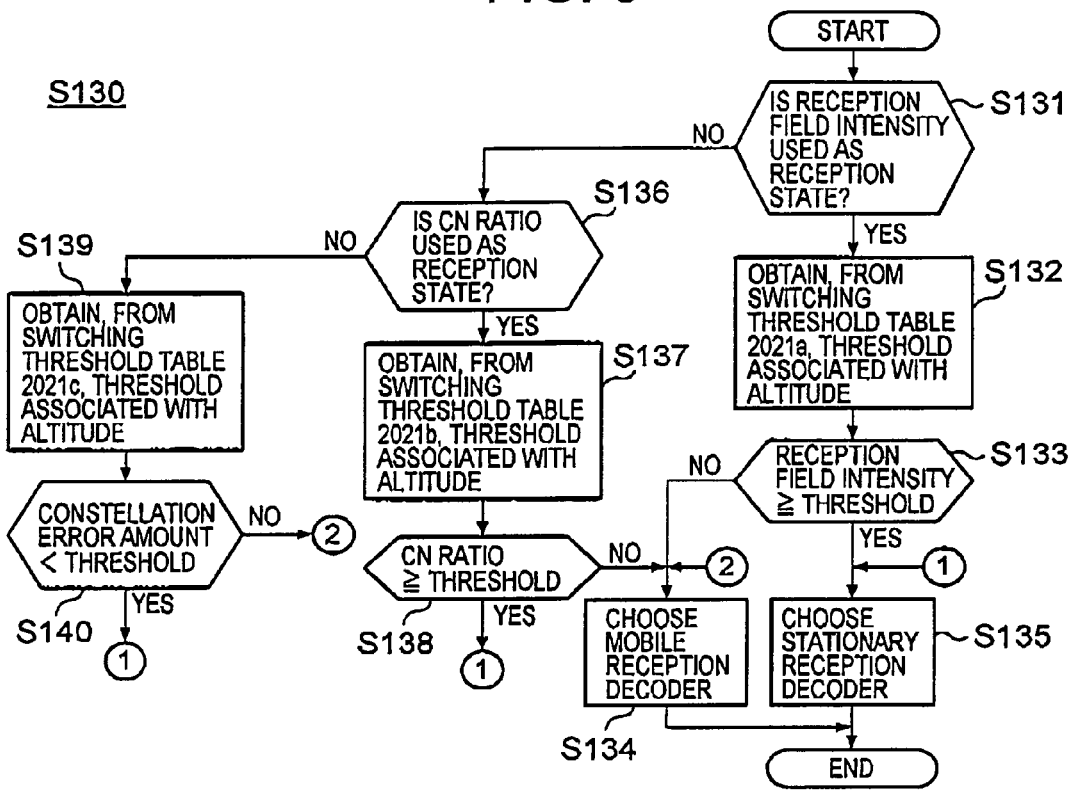
FIG. 9 is a flow chart showing an example of threshold switching processing in Step S130.

FIG. 9 is a flow chart showing an example of threshold switching processing in Step S130. First, the decoder switching unit 203 judges, from preset information for specifying which switching threshold table is to be used, whether to employ the reception field intensity as the reception state (S131). When the reception field intensity is to be employed as the reception state (S131: Yes), the decoder switching unit 203 consults a switching threshold table 2021a to obtain a switching threshold that is associated with the altitude of the vehicle 15 obtained in Step S104 (S132).

The decoder switching unit 203 then judges whether or not a reception field intensity value created by the digital broadcast demodulating unit 204 is equal to or stronger than the switching threshold obtained from the switching threshold table 2021a (S133). When the reception field intensity is equal to or stronger than the switching threshold (S133: Yes), the decoder switching unit 203 has the stationary reception decoder 200 decode twelve segments out of the thirteen segments extracted by the digital broadcast demodulating unit 204 and extract the high resolution image for stationary receivers (S135), thereby completing the processing of this flow chart.

On the other hand, when the reception field intensity is weaker than the switching threshold (S133: No), the decoder switching unit 203 has the mobile reception decoder 201 decode one segment out of the thirteen segments extracted by the digital broadcast demodulating unit 204 and extract the low resolution image for mobile receivers (S134), thereby completing the processing of this flow chart.

When it is judged in Step S131 that the receptionfield intensity is not to be used as the reception state (S131: No), the decoder switching unit 203 judges, from preset information for specifying which switching threshold table is to be used, whether to employ the CN ratio as the reception state (S136). When the CN ratio is to be employed as the reception state (S136: Yes), the decoder switching unit 203 consults a switching threshold table 2021b to obtain a switching threshold that is associated with the altitude of the vehicle 15 obtained in Step S104 (S137).

The decoder switching unit 203 then judges whether or not a CN ratio value created by the digital broadcast demodulating unit 204 is equal to or larger than the switching threshold obtained from the switching threshold table 2021b (S138). When the CN ratio is equal to or larger than the switching threshold (S138: Yes), the decoder switching unit 203 performs the processing shown in Step S135. On the other hand, when the CN ratio is smaller than the switching threshold (S138: No), the decoder switching unit 203 performs the processing shown in Step S134.

When it is judged in Step S136 that the CN ratio is not to be used as the reception state, in other words, the constellation error amount is to be employed as the reception state (S136: No), the decoder switching unit 203 consults a switching threshold table 2021c to obtain a switching threshold that is associated with the altitude of the vehicle 15 obtained in Step S104 (S139). The decoder switching unit 203 then judges whether or not a constellation error amount value created by the digital broadcast demodulating unit 204 is smaller than the switching threshold obtained from the switching threshold table 2021c (S140).

When the constellation error amount is smaller than the switching threshold (S140: Yes), the decoder switching unit 203 performs the processing shown in Step S135. On the other hand, when the constellation error amount is equal to or larger than the switching threshold (S140; No), the decoder switching unit 203 performs the processing shown in Step S134.

The first embodiment of the present invention has been described above.

As is clear from the above description, the digital broadcast receiving device 20 according to the first embodiment can display a high resolution image for stationary receivers longer while on the move without burdening users with a cumbersome operation.

The present invention is not limited to the above embodiment, and various modifications are possible without departing from the spirit of the present invention.

A second embodiment of the present invention is described below.

Figure 10:
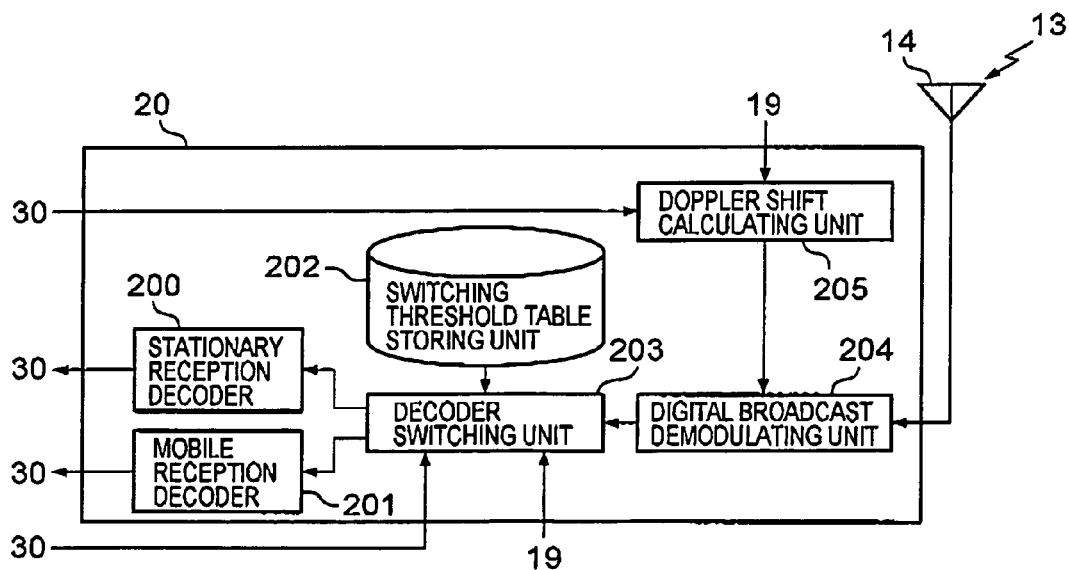
FIG. 10 is a diagram showing a detailed configuration example of a digital broadcast receiving device according to a second embodiment.

FIG. 10 shows a detailed configuration example of a digital broadcast receiving device 20 according to the second embodiment. The digital broadcast receiving device 20 has a stationary reception decoder 200, a mobile reception decoder 201, a switching threshold table storing unit 202, a decoder switching unit 203, a digital broadcast demodulating unit 204, and a Doppler shift calculating unit 205. The digital broadcast receiving device 20 of the second embodiment differs from the digital broadcast receiving device 20 shown in FIG. 2 in that the Doppler shift calculating unit 205 is added thereto. Components in FIG. 10 that are denoted by the same reference symbols as those in FIG. 2 have the same or similar functions as the components in FIG. 2, except for points described below, and descriptions of those components will therefore be omitted.

The Doppler shift calculating unit 205 calculates a direction difference θ between the direction from the current location of a vehicle 15 to the location of a digital broadcast relay station 13 and the travel direction of the vehicle 15. The Doppler shift calculating unit 205 obtains a vehicle speed v of the vehicle 15 from a sensor 19. The Doppler shift calculating unit 205 calculates a Doppler shift f of a received signal from the following relational expression:

$$|f| = \left| \frac{c \times f_0}{(c - v \times \cos\theta)} \right|$$ [Mathematical Expression 4]

where c represents the speed of light and $f_0$ represents the frequency of digital broadcast waves transmitted by the digital broadcast relay station 13.

In the case where the Doppler shift f calculated from Mathematical Expression 4 is larger than 50 Hz, the Doppler shift calculating unit 205 supplies to the digital broadcast demodulating unit 204 a control signal to shift the oscillation frequency of the receiver by the calculated Doppler shift f. The digital broadcast demodulating unit 204 thus corrects the influence of digital broadcast waves whose frequency has been shifted by the Doppler shift f due to the movement of the vehicle 15. This enables the digital broadcast demodulating unit 204 to demodulate the signal based on a received signal of improved quality, to extract and supply thirteen segments to the stationary reception decoder 200 and the mobile reception decoder 201, and to generate and supply a signal indicating the reception state to the decoder switching unit 203.

The Doppler shift f therefore does not affect the decoder switching unit 203 in making a switch between the stationary reception decoder 200 and the mobile reception decoder 201. In this embodiment, the location on a map of the digital broadcast relay station 13 is stored in advance in a map data storing unit 301 of a navigation device 30.

Figure 11:
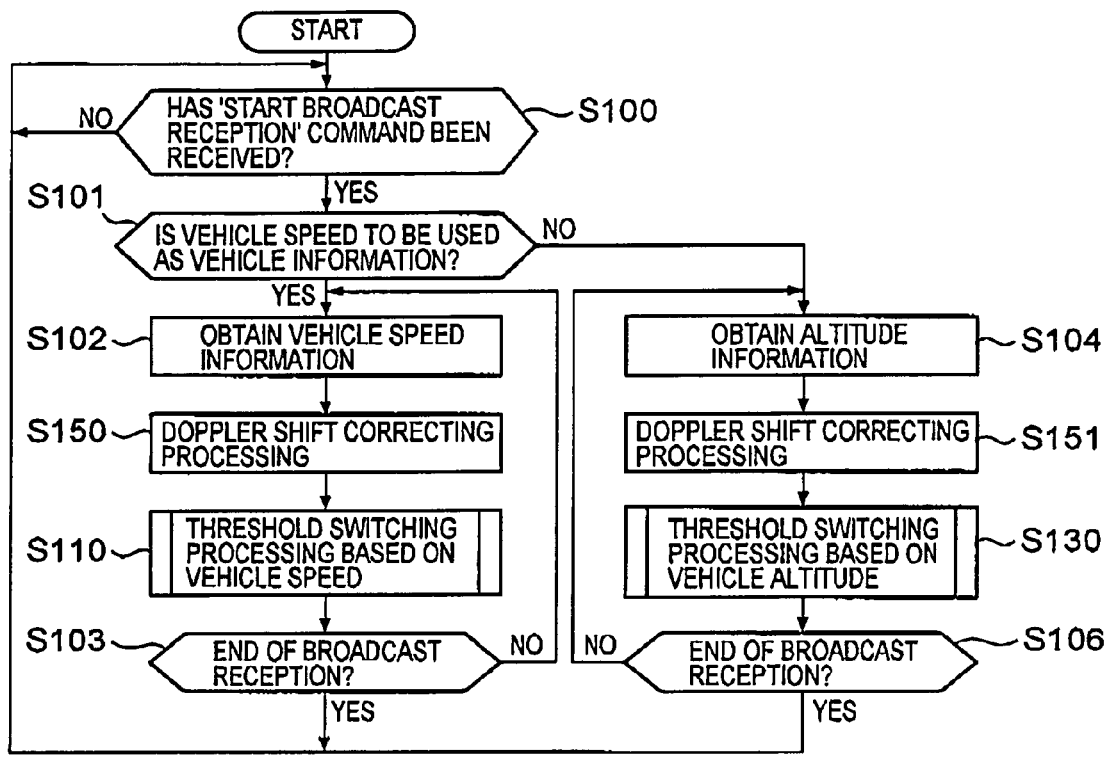
FIG. 11 is a flow chart showing an example of processing that is executed by the digital broadcast receiving device in the second embodiment.

FIG. 11 is a flow chart showing an example of processing that is executed by the digital broadcast receiving device 20 in the second embodiment. Processing in the flow chart of FIG. 11 that is denoted by the same reference symbol as the one in the flow chart of FIG. 7 has the same or similar processes as the processing in FIG. 7, except for points described below, and a description of such processing will therefore be omitted.

After the vehicle speed of the vehicle 15 is obtained in Step S102 (S102), the Doppler shift calculating unit 205 calculates from Mathematical Expression 4 the Doppler shift f of the received signal. The Doppler shift calculating unit 205 then supplies to the digital broadcast demodulating unit 204 a control signal to shift the oscillation frequency of the receiver by the calculated Doppler shift f, so that the digital broadcast demodulating unit 204 can improve the quality of the demodulated signal (S150).

Similarly, after the altitude of the vehicle 15 is obtained in Step S104 (S104), the Doppler shift calculating unit 205 calculates from Mathematical Expression 4 the Doppler shift f of the received signal. The Doppler shift calculating unit 205 then supplies to the digital broadcast demodulating unit 204 a control signal to shift the oscillation frequency of the receiver by the calculated Doppler shift f, so that the digital broadcast demodulating unit 204 can improve the quality of the demodulated signal (S151).

Figure 12:
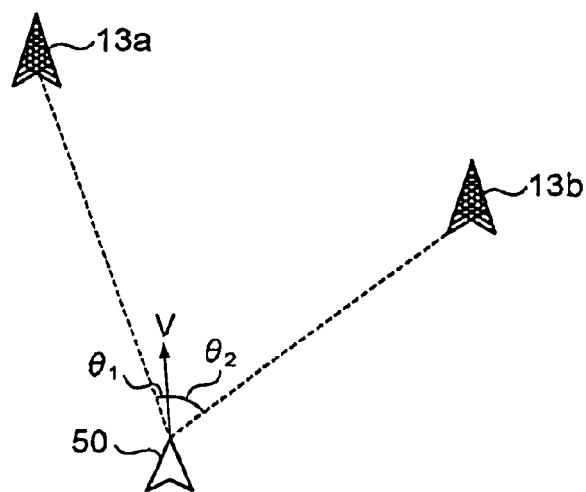
FIG. 12 is a conceptual diagram illustrating how the digital broadcast receiving device operates when there are plural digital broadcast relay stations within a given distance from a current location of a vehicle.

FIG. 12 is a conceptual diagram illustrating how the digital broadcast receiving device 20 operates when there are plural digital broadcast relay stations 13 within a given distance from the current location of the vehicle 15. In this embodiment, the digital broadcast receiving device 20 receives digital broadcast signals only from one of the digital broadcast relay stations 13 that has the strongest reception field intensity. Then, the Doppler shift calculating unit 205 calculates the Doppler shift f of the respective digital broadcast relay stations 13, and measures the reception field intensity of a signal from each digital broadcast relay station 13 using a signal that is received after the influence of the Doppler shift f is removed.

In the example of FIG. 12, the digital broadcast receiving device 20 calculates a Doppler shift fa from a digital broadcast relay station 13a by Mathematical Expression 4 using a direction difference $\theta_1$ between the direction of the digital broadcast relay station 13a viewed from a vehicle location 50 and the travel direction of the vehicle 15 at the vehicle location 50, and the vehicle speed v of the vehicle 15 at the vehicle location 50. The influence of the calculated Doppler shift fa is corrected in a signal received from the digital broadcast relay station 13a, and the reception field intensity of the digital broadcast relay station 13a is measured using this signal. The digital broadcast receiving device 20 also calculates a Doppler shift fb from a digital broadcast relay station 13b by Mathematical Expression 4 using the direction difference $\theta_2$ and the vehicle speed v. The influence of the calculated Doppler shift fb is corrected in a signal received from the digital broadcast relay station 13b, and the reception field intensity of a signal from the digital broadcast relay station 13b is measured using this signal. The digital broadcast receiving device 20 compares the reception field intensity of a signal from the digital broadcast relay station 13a against the reception field intensity of a signal from the digital broadcast relay station 13b to determine from which digital broadcast relay station 13 digital broadcast waves are to be received.

Alternatively, the digital broadcast receiving device 20 may determine from which digital broadcast relay station 13 digital broadcast waves are to be received based on the CN ratio or the constellation error amount after the influence of the Doppler shift f is corrected.

The second embodiment of the present invention has been described above.

Described next is a third embodiment of the present invention.

Figure 13:
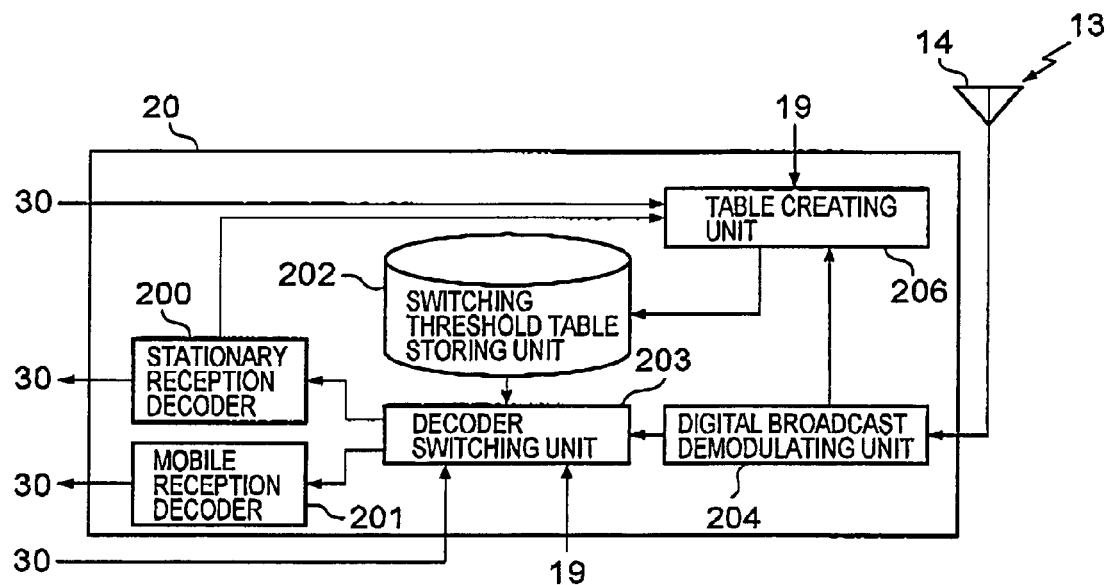
FIG. 13 is a diagram showing a detailed configuration example of a digital broadcast receiving device according to a third embodiment.

FIG. 13 shows a detailed configuration example of a digital broadcast receiving device 20 according to the third embodiment. The digital broadcast receiving device 20 has a stationary reception decoder 200, a mobile reception decoder 201, a switching threshold table storing unit 202, a decoder switching unit 203, a digital broadcast demodulating unit 204, and a table creating unit 206. The digital broadcast receiving device 20 of the third embodiment differs from the digital broadcast receiving device 20 shown in FIG. 2 in that the table creating unit 206 is added thereto. Components in FIG. 13 that are denoted by the same reference symbols as those in FIG. 2 have the same or similar functions as the components in FIG. 2, except for points described below, and descriptions of those components will therefore be omitted.

The table creating unit 206 sets values of every switching threshold table in the switching threshold table storing unit 202 to the lowest level when a 'create switching threshold table' command is received from the user via the display control unit 303. For instance, in a switching threshold table where the reception state corresponds to the reception field intensity, all threshold values regarding the vehicle speed and the altitude are set to −100 dBm. As a result, the decoder switching unit 203 always chooses the stationary reception decoder 200 as a decoder for decoding the thirteen segments demodulated by the digital broadcast demodulating unit 204.

The table creating unit 206 then obtains the vehicle speed and altitude of the vehicle 15, the reception field intensity, the CN ratio, and the constellation error amount at regular intervals, for example, for every second. Based on the received digital broadcast signal, the table creating unit 206 measures the quality of the high resolution image for stationary reception that has been extracted by the stationary reception decoder 200. The table creating unit 206 judges the image reception quality by, for example, determining whether or not an error indicator contained in a TS packet of MPEG-2 is on.

The table creating unit 206 stores, as a switching threshold, the reception state of when the number of TS packets with their error indicators turned on, among TS packets containing pixels that constitute one screen, is within a given range (for example, between one packet and three packets).

When a given number of switching thresholds is stored, the table creating unit 206 creates, from the stored switching thresholds, a switching threshold table 2020 and a switching threshold table 2021 which correspond to signals indicating the respective reception states. The created tables are stored in the switching threshold table storing unit 202.

Figure 14:
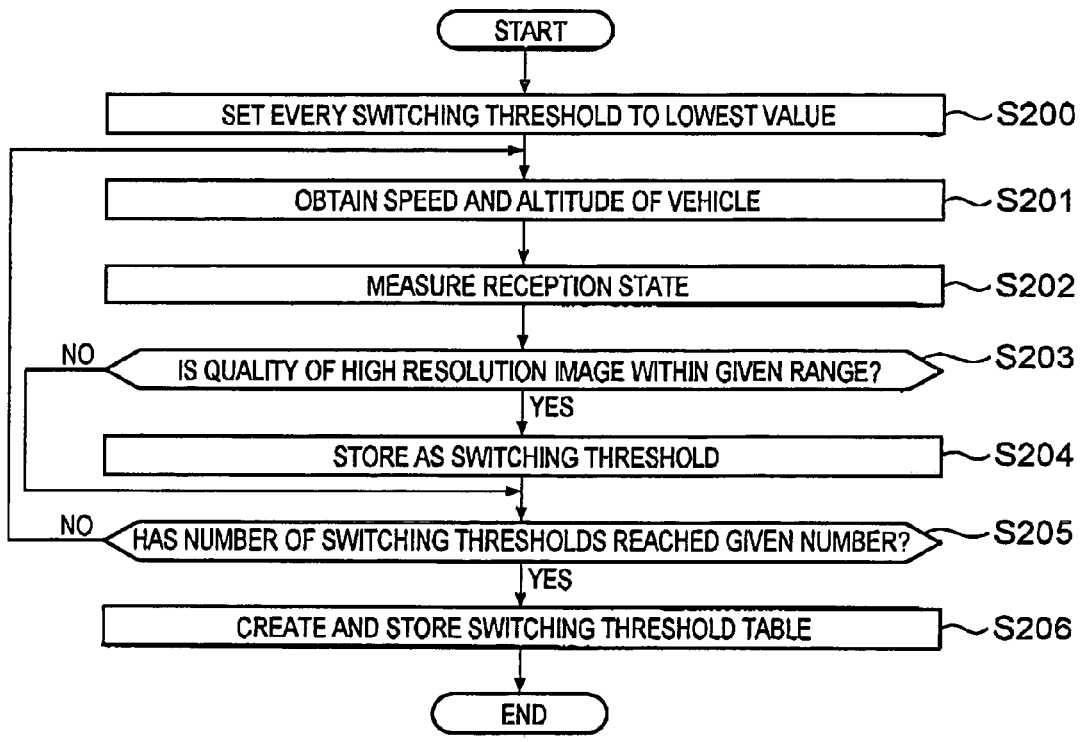
FIG. 14 is a flow chart showing an example of processing that is executed by the digital broadcast receiving device in the third embodiment.

FIG. 14 is a flow chart showing an example of processing that is executed by the digital broadcast receiving device 20 in the third embodiment. The table creating unit 206 starts the processing shown in this flow chart when, for example, a 'create switching threshold table' command is received from the user through a display control unit 303.

First, the table creating unit 206 sets values of every switching threshold table in the switching threshold table storing unit 202 to the lowest level (S200), except the constellation error amount, which is set to a maximum value. The table creating unit 206 then obtains the vehicle speed of the vehicle 15 from a sensor 19 and the altitude of the vehicle 15 from an altitude calculating unit 304 (S201).

Next, the table creating unit 206 obtains the reception field intensity, the CN ratio, and the constellation error amount as the reception state from the digital broadcast demodulating unit 204 (S202). The table creating unit 206 determines whether or not the number of TS packets with their error indicators turned on, among TS packets containing pixels that constitute one screen, is within a given range (for example, between one packet and three packets), to thereby judge the quality of the high resolution image for stationary reception that has been extracted by the stationary reception decoder 200 (S203).

When the quality of the high resolution image for stationary reception is not within a given range (S203: No), the table creating unit 206 performs processing shown in Step S205. When the quality of the high resolution image for stationary reception is within the given range (S203: Yes), the table creating unit 206 stores as switching thresholds the respective signals that indicate the current reception state (S204). The table creating unit 206 then judges whether or not the number of switching thresholds stored has reached a given number (S205). When the given number has not been reached (S205: No), the table creating unit 206 again performs the processing shown in Step S201.

When the number of switching thresholds stored has reached the given number (S205: Yes), the table creating unit 206 creates a switching threshold table from the collected switching thresholds, and stores the created switching threshold table in the switching threshold table storing unit 202 (S206), thereby completing the processing of this flow chart. In Step S206, if there are plural switching thresholds corresponding to different reception states at the same vehicle speed or altitude, the table creating unit 206 creates a switching threshold table from, for example, the mean value of the switching thresholds.

In Step S204, the table creating unit 206 may store a switching threshold in association with information for specifying a location where a reception state corresponding to this switching threshold is measured (e.g., the latitude and longitude of the location).

The third embodiment of the present invention has been described above.

The present invention is not limited to the above embodiments. For instance, the digital broadcast receiving device 20, which, in the above embodiments, switches between two digital broadcast decoders, the stationary reception decoder 200 and the mobile reception decoder 201, in accordance with vehicle information and the reception state, may switch between three or more digital broadcast decoders in accordance with vehicle information and the reception state.

Also, the digital broadcast receiving device 20 in the above embodiments switches between a decoder that decodes twelve segments out of thirteen segments extracted by the digital broadcast demodulating unit 204 and a decoder that decodes one segment out of the thirteen segments, but the present invention is not limited thereto. For instance, the digital broadcast receiving device 20 may switch between a decoder that decodes nine segments out of thirteen segments extracted by the digital broadcast demodulating unit 204, a decoder that decodes three segments out of the thirteen segments, and a decoder that decodes one segment out of the thirteen segments in accordance with vehicle information and the reception state.

What is claimed is:

1. A digital broadcast receiving device mounted on a mobile body, comprising:
    a mobile body information obtaining means which obtains mobile body information that is information about the mobile body;
    a demodulating means which receives a digital broadcast wave, demodulates the digital broadcast wave, and outputs a reception state of the digital broadcast wave;
    plural digital broadcast decoders which decode a signal demodulated by the demodulating means and output digital broadcast images different from one another;
    a switching threshold storing means which associates with the mobile body information and stores in advance a switching threshold used in choosing, in accordance with the reception state, which one of the plural digital broadcast decoders is to decode the signal demodulated by the demodulating means; and
    a decoder switching means which consults the switching threshold storing means to obtain a switching threshold that is associated with the mobile body information, which chooses one of the digital broadcast decoders, based on the reception state and the obtained switching threshold, to decode the signal demodulated by the demodulating means, and which displays results of the decoding on a display device.

2. A digital broadcast receiving device according to claim 1, wherein
    the plural digital broadcast decoders include;
        a mobile reception decoder which decodes the signal demodulated by the demodulating means and outputs a digital broadcast image for mobile receivers; and
        a stationary reception decoder which decodes the signal demodulated by the demodulating means and outputs a digital broadcast image for stationary receivers; and the decoder switching means chooses, based on the switching threshold obtained from the switching threshold storing means based on the reception state output by the demodulating means and the mobile body information, which of the stationary reception decoder and the mobile reception decoder is to decode the signal demodulated by the demodulating means.

3. A digital broadcast receiving device according to claim 2, wherein
the mobile body information comprises speed of the mobile body,
the reception state comprises a reception field intensity of when the demodulating means receives the digital broadcast wave,
the switching means, when the reception field intensity is equal to or stronger than a switching threshold that is associated with the speed of the mobile body, causes the stationary reception decoder to decode the signal demodulated by the demodulating means, and
the switching means, when the reception field intensity is weaker than the switching threshold that is associated with the speed of the mobile body, causes the mobile reception decoder to decode the signal demodulated by the demodulating means.

4. A digital broadcast receiving device according to claim 2, wherein
the mobile body information comprises speed of the mobile body,
the reception state comprises a carrier to noise (CN) ratio of when the demodulating means receives the digital broadcast wave,
the switching means, when the CN ratio is equal to or larger than a switching threshold that is associated with the speed of the mobile body, causes the stationary reception decoder to decode the signal demodulated by the demodulating means, and
the switching means, when the CN ratio is smaller than the switching threshold that is associated with the speed of the mobile body, causes the mobile reception decoder to decode the signal demodulated by the demodulating means.

5. A digital broadcast receiving device according to claim 2, wherein
the mobile body information comprises speed of the mobile body,
the reception state comprises a constellation error amount of when the demodulating means demodulates the digital broadcast wave,
the switching means, when the constellation error amount is smaller than a switching threshold that is associated with the speed of the mobile body, causes the stationary reception decoder to decode the signal demodulated by the demodulating means, and
the switching means, when the constellation error amount is equal to or larger than the switching threshold that is associated with the speed of the mobile body, causes the mobile reception decoder to decode the signal demodulated by the demodulating means.

6. A digital broadcast receiving device according to claim 2, wherein
the mobile body information comprises the altitude of the mobile body,
the reception state comprises a reception field intensity of when the demodulating means receives the digital broadcast wave,
the switching means, when the reception field intensity is equal to or stronger than a switching threshold that is associated with the altitude of the mobile body, causes the stationary reception decoder to decode the signal demodulated by the demodulating means, and
the switching means, when the reception field intensity is weaker than the switching threshold that is associated with the altitude of the mobile body, causes the mobile reception decoder to decode the signal demodulated by the demodulating means.

7. A digital broadcast receiving device according to claim 2, wherein
the mobile body information comprises the altitude of the mobile body,
the reception state comprises a carrier to noise (CN) ratio of when the demodulating means receives the digital broadcast wave,
the switching means, when the CN ratio is equal to or larger than a switching threshold that is associated with the altitude of the mobile body, causes the stationary reception decoder to decode the signal demodulated by the demodulating means, and
the switching means, when the CN ratio is smaller than the switching threshold that is associated with the altitude of the mobile body, causes the mobile reception decoder to decode the signal demodulated by the demodulating means.

8. A digital broadcast receiving device according to claim 2, wherein
the mobile body information comprises the altitude of the mobile body,
the reception state comprises a constellation error amount of when the demodulating means demodulates the digital broadcast wave,
the switching means, when the constellation error amount is smaller than a switching threshold that is associated with the altitude of the mobile body, causes the stationary reception decoder to decode the signal demodulated by the demodulating means, and
the switching means, when the constellation error amount is equal to or larger than the switching threshold that is associated with the altitude of the mobile body, causes the mobile reception decoder to decode the signal demodulated by the demodulating means.

9. A digital broadcast receiving method for a digital broadcast receiving device mounted on a mobile body, wherein the digital broadcast receiving device performs the steps of:
receiving a digital broadcast wave, demodulating the digital broadcast wave, and outputting a reception state of the digital broadcast wave;
obtaining mobile body information that is information about the mobile body;
obtaining a switching threshold that is associated with the mobile body information, from a switching threshold storing means which associates with the mobile body information and stores in advance a switching threshold for switching between plural digital broadcast decoders in accordance with the reception state, the digital broadcast decoders decoding a demodulated signal to output digital broadcast images different from one another; and
making one of the plural digital broadcast decoders, based on the reception state and the obtained switching threshold, decode the demodulated signal, and displaying results of the decoding on a display device.

10. A program which makes a digital broadcast receiving device mounted on a mobile body operate, the program comprising:
a mobile body information obtaining function which obtains mobile body information that is information about the mobile body;
a demodulating function which receives a digital broadcast wave, demodulates the digital broadcast wave, and outputs a reception state of the digital broadcast wave;

plural digital broadcast decoding functions which decode a signal demodulated by the demodulating function, and which output digital broadcast images different from one another;

a switching threshold storing function which associates with the mobile body information and stores in advance a switching threshold used in choosing, in accordance with the reception state, which one of the digital broadcast decoders is to decode the signal demodulated by the demodulating function; and a decoder switching function which consults the switching threshold storing function to obtain a switching threshold that is associated with the mobile body information, makes one of the plural digital broadcast decoders, based on the reception state and the obtained switching threshold, decode the signal demodulated by the demodulating function, and displays results of the decoding on a display device.

* * * * *

UNITED STATES PATENT AND TRADEMARK OFFICE
CERTIFICATE OF CORRECTION

PATENT NO.       : 7,606,527 B2
APPLICATION NO.  : 11/509740
DATED            : October 20, 2009
INVENTOR(S)      : Tomobe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this

Twelfth Day of October, 2010

David J. Kappos
*Director of the United States Patent and Trademark Office*